US012601453B1

(12) United States Patent
Ye et al.

(10) Patent No.: US 12,601,453 B1
(45) Date of Patent: Apr. 14, 2026

(54) DUAL-LIGHT SOURCE CEILING-MOUNTED LED LIGHTING FIXTURE

(71) Applicant: Shenzhen Hezhimu Decoration Lighting Co., Ltd., Shenzhen City (CN)

(72) Inventors: Hua Ye, Shenzhen City (CN); Dongtian Ye, Shenzhen City (CN); Qingcheng Ye, Shenzhen City (CN)

(73) Assignee: Shenzhen Hezhimu Decoration Lighting Co., Ltd., Shenzhen City (CN)

( * ) Notice: Subject to any disclaimer, the term of this patent is extended or adjusted under 35 U.S.C. 154(b) by 0 days.

(21) Appl. No.: 19/253,998

(22) Filed: Jun. 30, 2025

(30) Foreign Application Priority Data

Jun. 13, 2025 (CN) .......................... 202510793959.3

(51) Int. Cl.
| | |
|---|---|
| *F21S 8/04* | (2006.01) |
| *F21V 8/00* | (2006.01) |
| *F21Y 113/00* | (2016.01) |
| *F21Y 115/10* | (2016.01) |

(52) U.S. Cl.
CPC .............. *F21S 8/04* (2013.01); *G02B 6/0068* (2013.01); *G02B 6/0076* (2013.01); *F21Y 2113/00* (2013.01); *F21Y 2115/10* (2016.08)

(58) Field of Classification Search
CPC . G02B 6/0076; G02B 6/0068; F21Y 2113/00; F21Y 2115/10
See application file for complete search history.

(56) References Cited

U.S. PATENT DOCUMENTS

| | | | |
|---|---|---|---|
| 10,731,808 B2 * | 8/2020 | Ferrari | .................. F21V 7/0016 |
| 2012/0294007 A1 * | 11/2012 | Matsumoto | ............. F21V 23/00 |
| | | | 362/249.02 |

FOREIGN PATENT DOCUMENTS

WO     WO-2012158894 A2 *  11/2012   ............. H05B 45/20

OTHER PUBLICATIONS

Innovation Q+ NPL Search (Year: 2026).*

* cited by examiner

*Primary Examiner* — Anabel Ton
(74) *Attorney, Agent, or Firm* — Che-Yang Chen

(57) ABSTRACT

The present invention relates to a dual-light source ceiling-mounted LED lighting fixture, comprising a first light source, a second light source, and a fixture body, wherein the first light source and the second light source are disposed within the fixture body. The first light source is a planar light source, wherein the first light source is configured to generate ambient light, and the ambient light is used to enhance the ambient lighting effect. The second light source is a point light source, wherein the second light source is configured to generate illumination light, the illumination light is used to provide functional lighting.

17 Claims, 7 Drawing Sheets

DUAL-LIGHT SOURCE CEILING-MOUNTED LED LIGHTING FIXTURE

FIELD OF INVENTION

The present invention relates to an LED lighting fixture, and more particularly to a ceiling-mounted LED lighting fixture comprising a first light source, a second light source, and a fixture body, the first light source and the second light source are disposed within the fixture body, wherein the first light source is a planar light source, and the second light source is a point light source.

DESCRIPTION OF RELATED ARTS

As is well known, various LED-based lighting fixtures have been widely adopted due to their excellent performance, particularly in the field of ceiling-mounted lights, where LED-based ceiling lighting fixtures are extensively used.

As shown in FIG. 1 to FIG. 2, there is a widely used ceiling-mounted LED lighting fixture (1), which is widely applied in commercial offices, office buildings and other constructions.

In practical use, the above-mentioned ceiling-mounted LED lighting fixture (1) is generally installed at the ceiling position, for example, being assembled together with ceiling panels of a roof.

The above-mentioned ceiling-mounted LED lighting fixture (1) generally comprises a frame (2) and a cover plate (3), wherein the cover plate (3) is mounted on top of the frame (2), and a light guide plate (4) is disposed in the frame (2). The side of the light guide plate (4) is provided with an LED light source (5). In order to improve the optical effect, a reflective film (6) is generally arranged on top of the light guide plate (4), and a light-transmitting panel (7) is disposed below the light guide plate (4). When in use, the above-mentioned ceiling-mounted LED lighting fixture (1) is fastened integrally into ceiling panels of a roof by means of the frame (2). The LED light source (5) emits light when powered, and the emitted light passes through the light guide plate (4) to provide illumination.

Similar technologies to the above-mentioned ceiling-mounted LED lighting fixture (1) have been disclosed in patent documents such as CN201811102673.2 and CN201510013757.9.

However, there are still many shortcomings in the use of the above-mentioned ceiling-mounted LED lighting fixture (1), which are now described as follows.

Firstly, in actual use, the above-mentioned ceiling-mounted LED lighting fixture (1) is generally used as a primary lighting fixture. If the brightness of the ceiling-mounted LED lighting fixture (1) is insufficient, the desired lighting effect cannot be achieved. Conversely, if the ceiling-mounted LED lighting fixture (1) has high brightness and a large light-emitting angle, it may cause glare and dazzling discomfort when viewed directly by human eyes.

Secondly, the above-mentioned ceiling-mounted LED lighting fixture (1) can only provide illumination light and does not have the decorative lighting effect. If indoor decorative lighting is required, additional decorative lighting fixtures must be installed.

The above describes the main disadvantages of the prior art.

SUMMARY OF THE PRESENT INVENTION

The technical solution adopted by the present invention is as follows: a dual-light source ceiling-mounted LED lighting fixture, comprising a first light source (100), a second light source (200), and a fixture body (300), wherein the first light source (100) and the second light source (200) are disposed within the fixture body (300), and the fixture body (300) is arranged in an illumination space (A). The first light source (100) is a planar light source, the first light source (100) is configured to generate ambient light (L1), the ambient light (L1) is irradiated into the illumination space (A), and the ambient light (L1) is used to enhance ambient lighting effect in the illumination space (A). The second light source (200) is a point light source, the second light source (200) is configured to generate illumination light (L2), the illumination light (L2) is irradiated into the illumination space (A), and the illumination light (L2) is used to provide functional lighting. The fixture body (300) comprises a ceiling light frame (310), and the ceiling light frame (310) has a first light source chamber (311) and a second light source chamber (312). The first light source (100) is disposed in the first light source chamber (311), and the second light source (200) is disposed in the second light source chamber (312).

A dual-light source ceiling-mounted LED lighting fixture, comprising a first light source (100), a second light source (200), and a fixture body (300), wherein the first light source (100) and the second light source (200) are disposed within the fixture body (300), and the fixture body (300) is arranged in an illumination space (A). The first light source (100) is a planar light source, the first light source (100) is configured to generate ambient light (L1), the ambient light (L1) is irradiated into the illumination space (A), and the ambient light (L1) is used to enhance ambient lighting effect in the illumination space (A). The second light source (200) is a point light source, the second light source (200) is configured to generate illumination light (L2), the illumination light (L2) is irradiated into the illumination space (A), and the illumination light (L2) is used to provide functional lighting. The fixture body (300) comprises a ceiling light frame (310), and the ceiling light frame (310) has a first light source chamber (311) and a second light source chamber (312). The first light source (100) is disposed in the first light source chamber (311), and the second light source (200) is disposed in the second light source chamber (312).

The first light source (100) comprises a light guide plate (110) and a plurality of LED light sources (120), and light emitted from a plurality of the LED light sources (120) passes through the light guide plate (110) and is irradiated out from the first light source chamber (311). The ambient light (L1) generated by the first light source (100) forms an irradiation region (C1) in the illumination space (A).

The second light source (200) has a light-emitting angle (B), and the illumination light (L2) generated by the second light source (200) is irradiated into the lighting space (A) to form an illumination region (C2). The illumination region (C2) is located within the irradiation region (C1).

The second light source (200) comprises an optical lens (210) and an LED point light source (220), the optical lens (210) has a light incident end (211) and a light emitting end (212), the LED point light source (220) corresponds to the light incident end (211), the illumination light (L2) emitted from the LED point light source (220) enters the optical lens (210) through the light incident end (211) and exits through the light emitting end (212), and light output angle of the optical lens (210) is the light-emitting angle (B) of the second light source (200).

The dual-light source ceiling-mounted LED lighting fixture further comprises a light source adjuster (400), the second light source (200) is mounted on the light source adjuster (400), and the light source adjuster (400) is capable of driving the second light source (200) to move upward or downward within the second light source chamber (312), thereby adjusting the area of the illumination region (C2) of the second light source (200).

The advantageous effect of the present invention is: a conventional ceiling-mounted lighting fixture is typically equipped only with a planar light source, which can only provide illumination light when operating. Its lighting brightness is limited and it lacks ambient decorative lighting effects. In contrast, the present invention innovatively integrates both a planar light source and a point light source within the fixture body (300). The planar light source generates ambient light (L1), which enhances ambient lighting effect, while the point light source generates illumination light (L2), which provides functional lighting. The lighting fixture of the present invention can significantly improve the lighting environment and greatly enhance the user experience.

DETAILED DESCRIPTION OF THE PREFERRED EMBODIMENT

As shown in FIGS. 3 to 15, a dual-light source ceiling-mounted LED lighting fixture comprises a first light source (100), a second light source (200), and a fixture body (300), wherein the first light source (100) and the second light source (200) are disposed within the fixture body (300), and the fixture body (300) is arranged in an illumination space (A).

Figure 1:
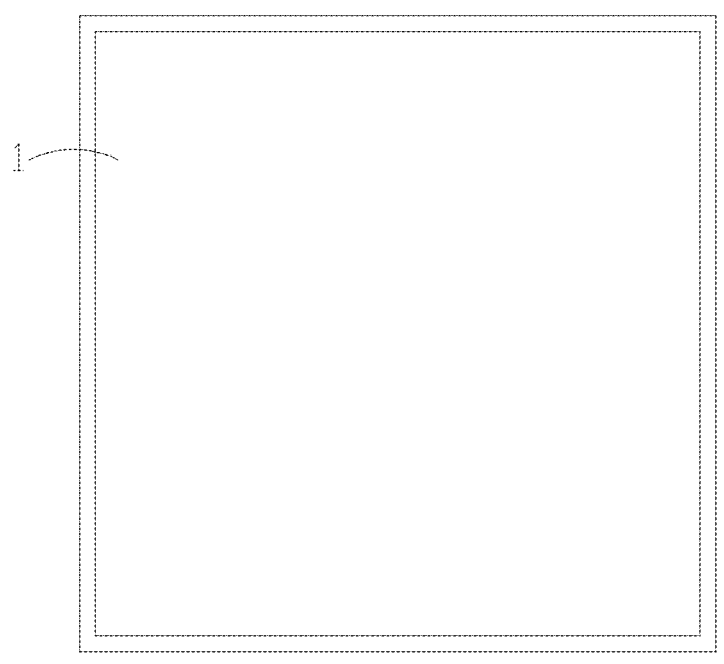
FIG. 1 is a front view of the prior art.
Figure 2:
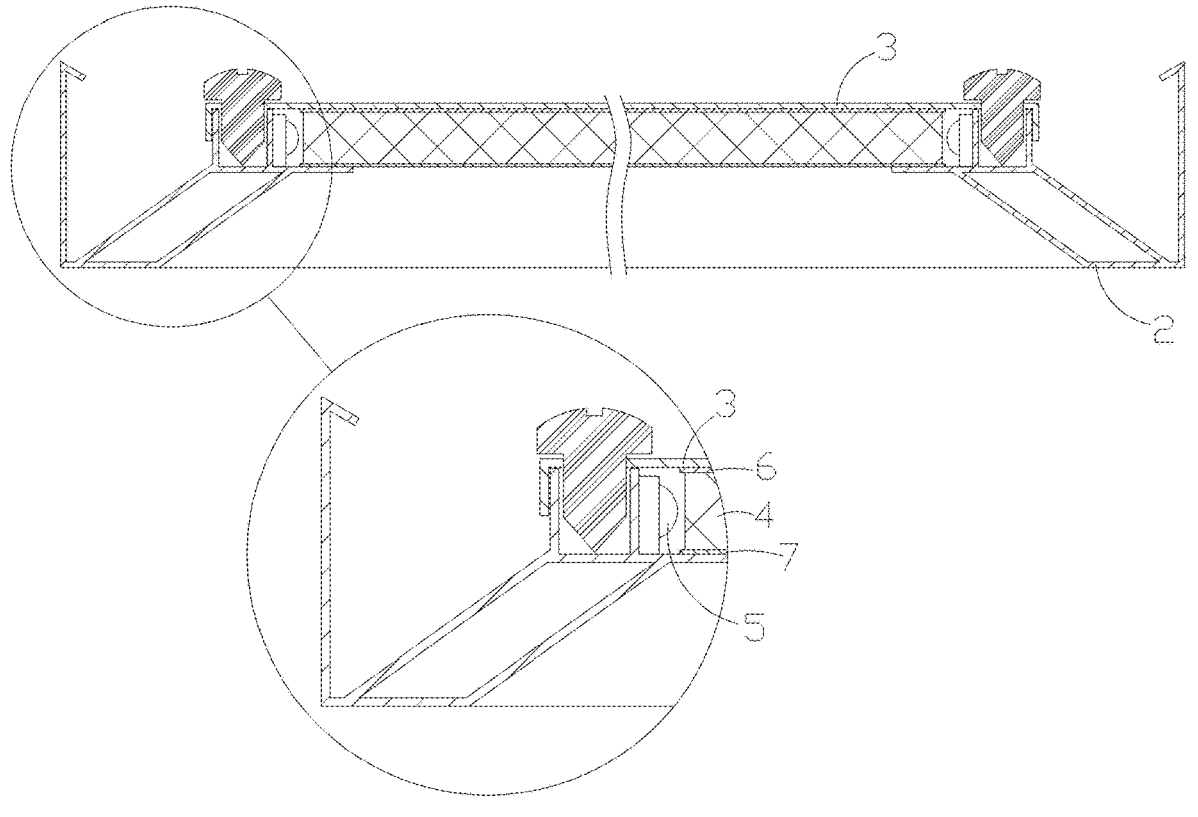
FIG. 2 is a cross-sectional structural view of the prior art.
Figure 3:
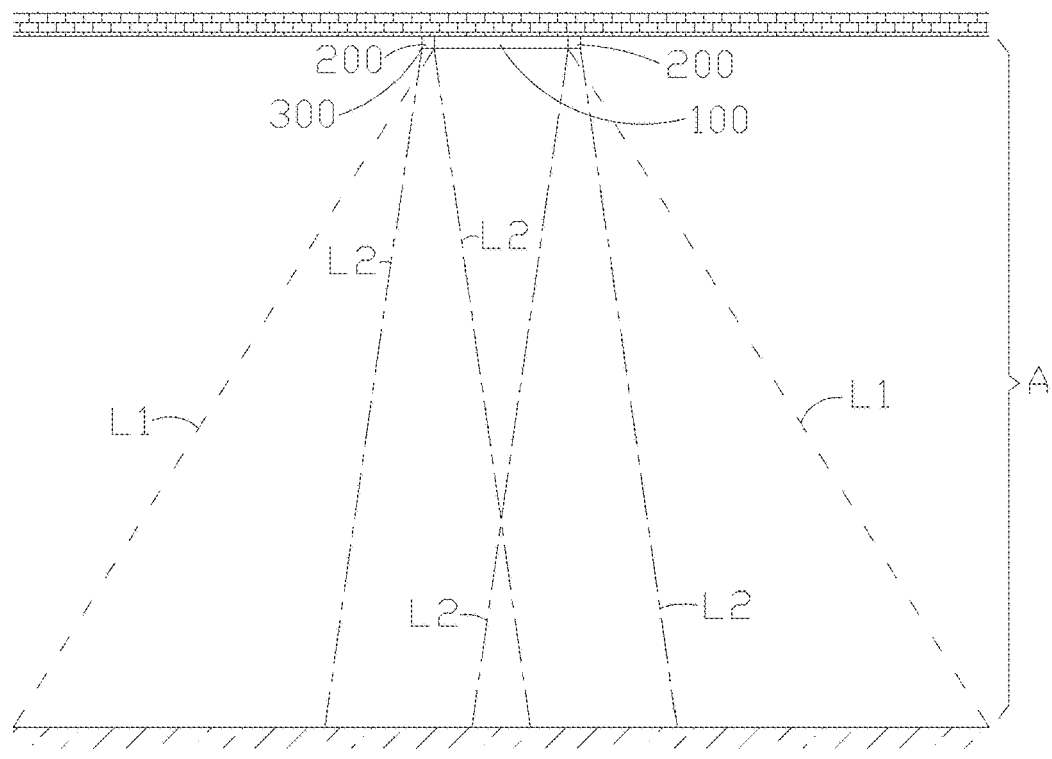
FIG. 3 is a schematic view of light emission from the first light source and the second light source of the present invention.

As shown in FIG. 3, wherein the first light source (100) is a planar light source, the first light source (100) is configured to generate ambient light (L1), the ambient light (L1) is irradiated into the illumination space (A), and the ambient light (L1) is used to enhance ambient lighting effect in the illumination space (A).

In practice, the ambient light (L1) may be light of different colors, or light whose color and brightness can be varied, or other forms of light that can improve the lighting decorative effect. The types of ambient light and the decorative lighting effects are known in the art and will not be elaborated here.

In a specific embodiment, the ambient light (L1) also has a certain illumination function.

Wherein the second light source (200) is a point light source, the second light source (200) is configured to generate illumination light (L2), the illumination light (L2) is irradiated into the illumination space (A), and the illumination light (L2) is used to provide functional lighting.

The design concept of the present invention is that a conventional ceiling-mounted lighting fixture is typically equipped only with a planar light source, which can only provide illumination light when operating. Its lighting brightness is limited and it lacks ambient decorative lighting effects. In contrast, the present invention innovatively integrates both a planar light source and a point light source within the fixture body (300). The planar light source generates ambient light (L1), which enhances ambient lighting effect, while the point light source generates illumination light (L2), which provides functional lighting. The lighting fixture of the present invention can significantly improve the lighting environment and greatly enhance the user experience.

Figure 4:
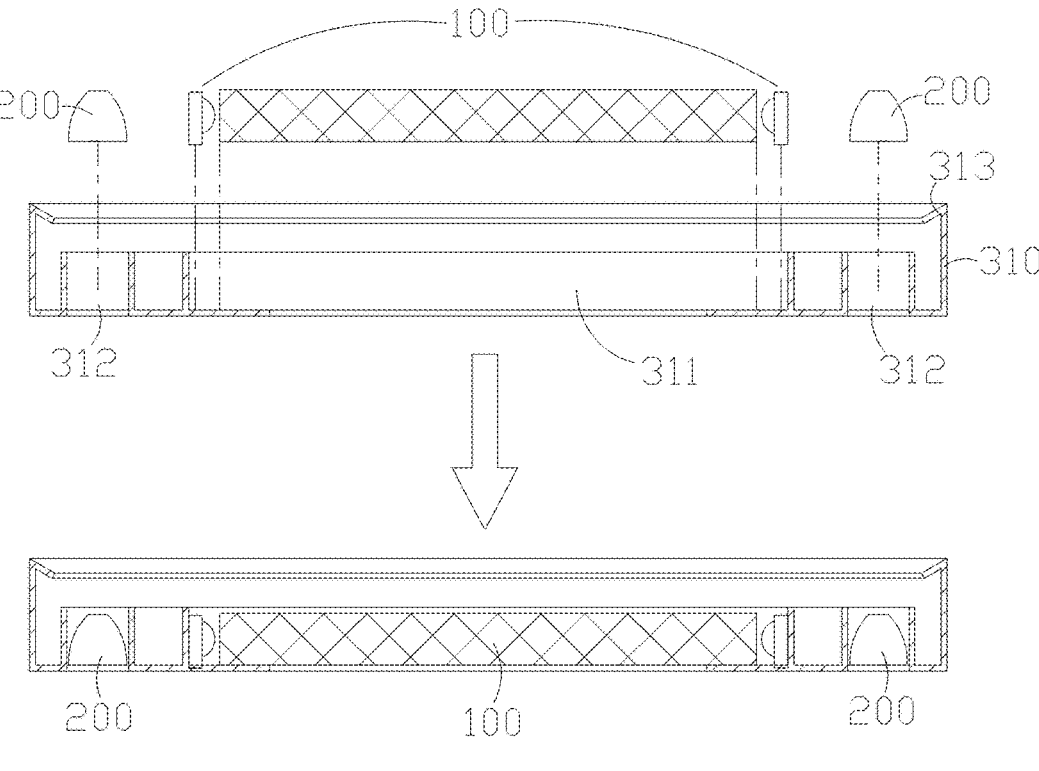
FIG. 4 is a structural view of the present invention.
Figure 5:
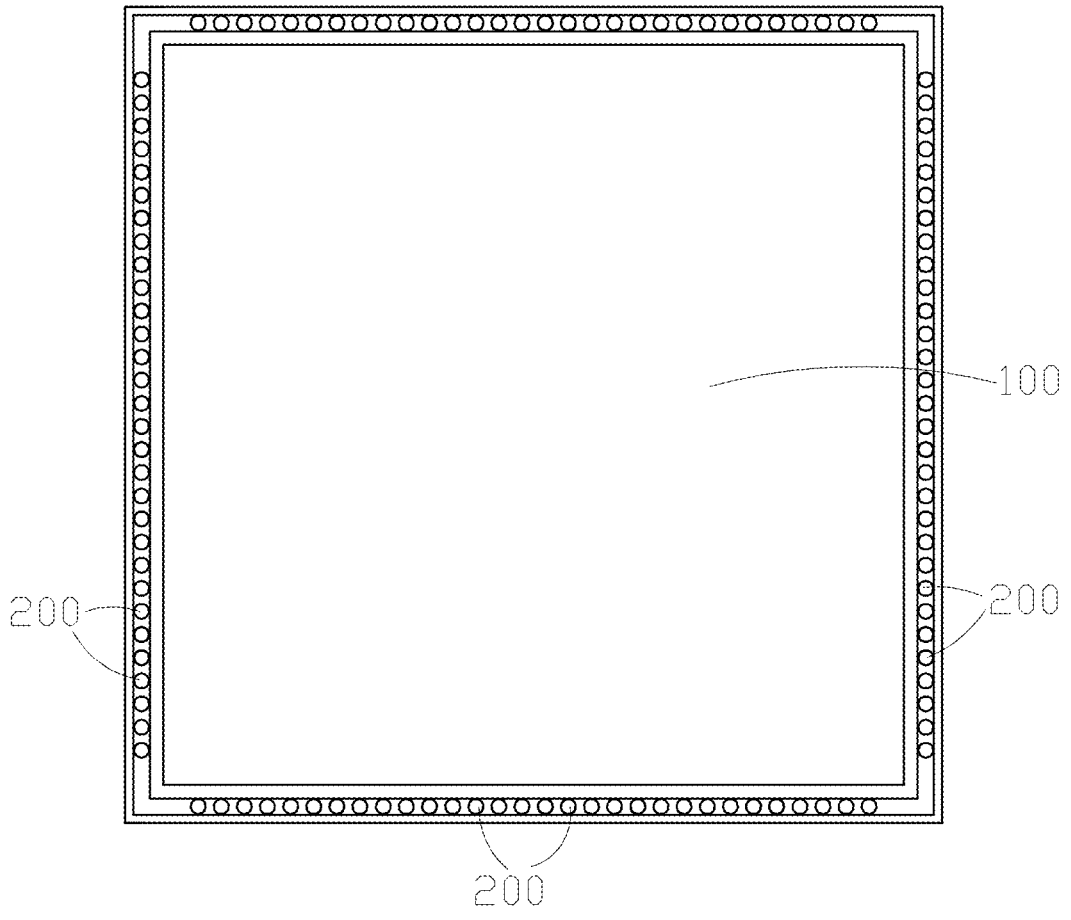
FIG. 5 is a front view of the present invention.
Figure 6:
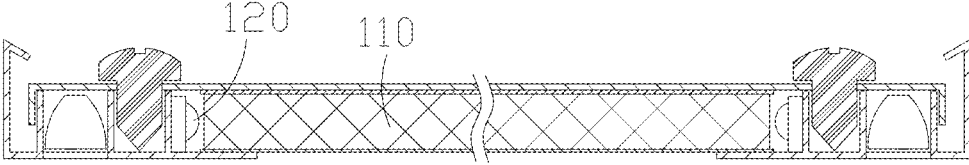
FIG. 6 is a cross-sectional structural view of the present invention.

As shown in FIG. 4 to FIG. 6, the fixture body (300) comprises a ceiling light frame (310), and the ceiling light frame (310) has a first light source chamber (311) and a second light source chamber (312). The first light source (100) is disposed in the first light source chamber (311), and the second light source (200) is disposed in the second light source chamber (312).

In a specific embodiment, a mounting flange (313) is provided around the ceiling light frame (310), and the fixture body (300) is configured to be fastened integrally into a ceiling panel of a roof via the mounting flange (313).

By integrating the first light source (100) and the second light source (200) through the ceiling light frame (310), the present invention can simplify the structure of the product and reduce manufacturing cost. In practice, no additional components are required to accommodate both the first light source (100) and the second light source (200) within the fixture body (300).

Figure 7:
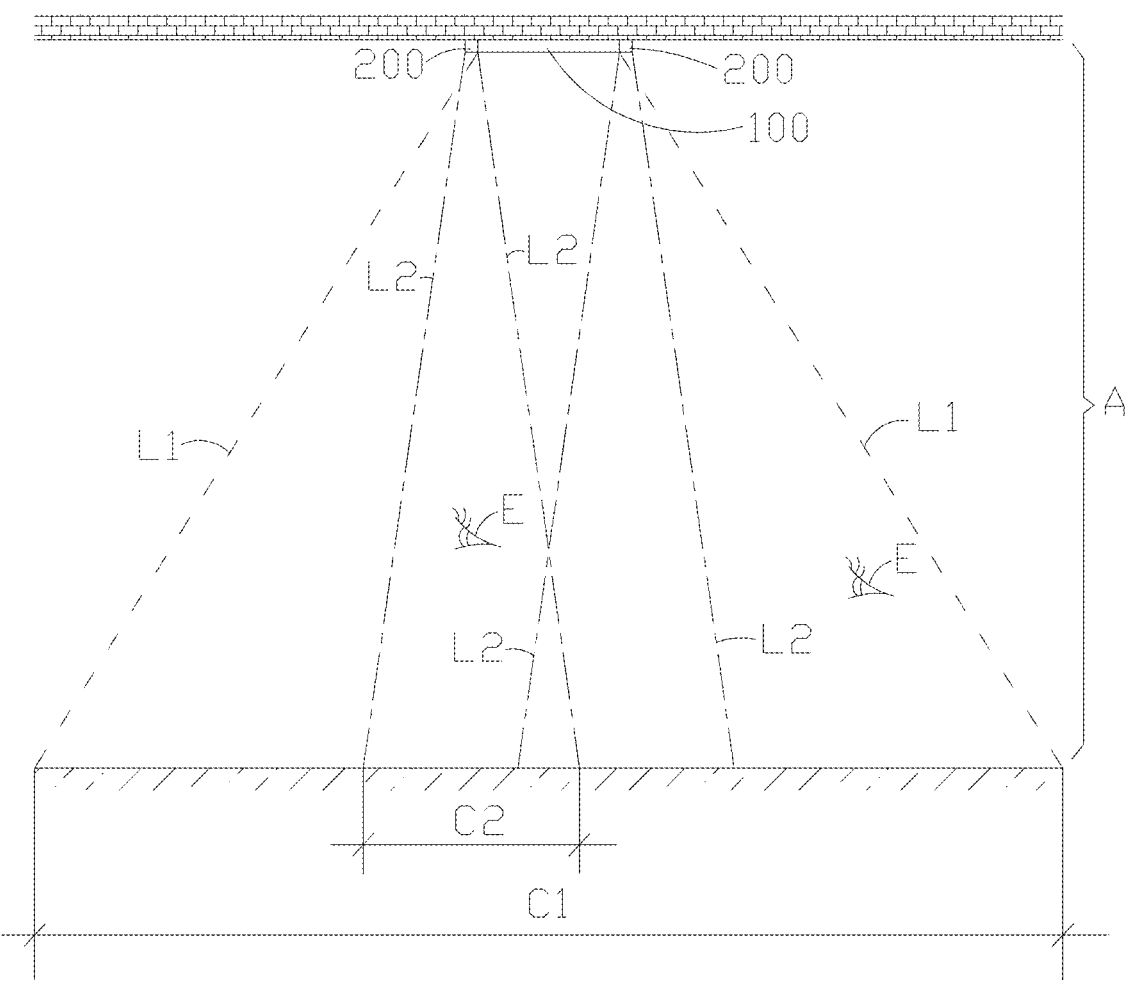
FIG. 7 is a schematic view of the irradiation region and the illumination region of the present invention.

As shown in FIG. 7, in a specific embodiment, the first light source (100) comprises a light guide plate (110) and a plurality of LED light sources (120), and light emitted from a plurality of the LED light sources (120) passes through the light guide plate (110) and is irradiated out from the first light source chamber (311). The ambient light (L1) generated by the first light source (100) forms an irradiation region (C1) in the illumination space (A).

In practice, a plurality of the LED light sources (120) may be of different colors to enhance ambient lighting effect. Additionally, a plurality of the LED light sources (120) may be connected to a control IC for controlling the light-emitting states of the LED light sources (120), such as brightness level, intermittent flashing, and other variations, thereby further enhancing ambient lighting effect. Moreover, a colored light-transmitting film may be applied over the light guide plate (110) to enhance ambient lighting effect.

In a specific embodiment, the first light source (100) has several preferred implementations, which are described respectively as follows.

Figure 8:
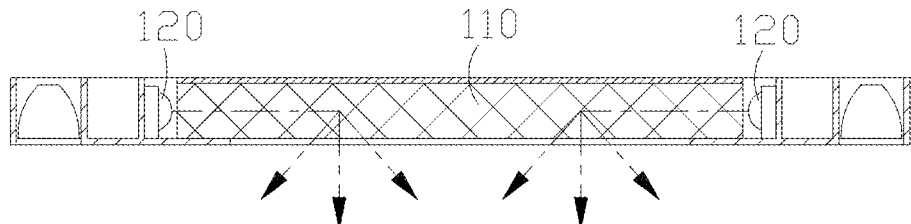
FIG. 8 is a light path diagram of a first embodiment of the first light source of the present invention.

As shown in FIG. 8, in a first embodiment, a plurality of the LED light sources (120) are arranged around the periphery of the light guide plate (110), and light emitted from the LED light sources (120) enters the light guide plate (110) through side surfaces of the light guide plate (110), and exits through a bottom surface of the light guide plate (110). A top surface of the light guide plate (110) is covered with a reflective film.

Figure 9:
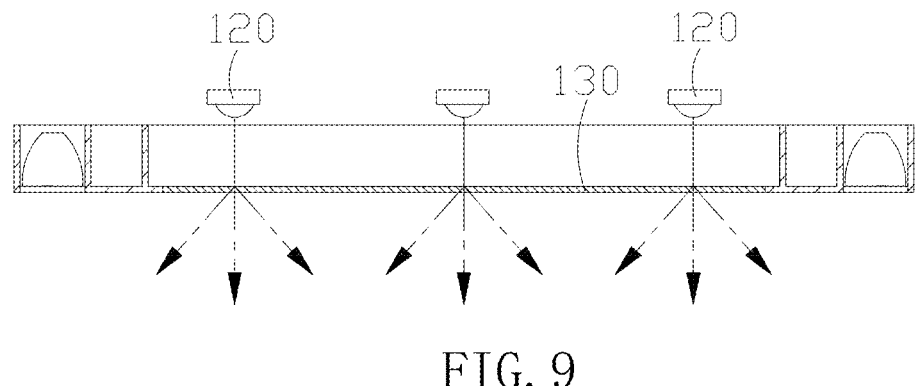
FIG. 9 is a light path diagram of a second embodiment of the first light source of the present invention.

As shown in FIG. 9, in a second embodiment, a plurality of the LED light sources (120) are arranged on top of a light guide panel (130), and light emitted from the LED light sources (120) enters through a top surface of the light guide panel (130) and exits through a bottom surface of the light guide panel (130).

Figure 10:
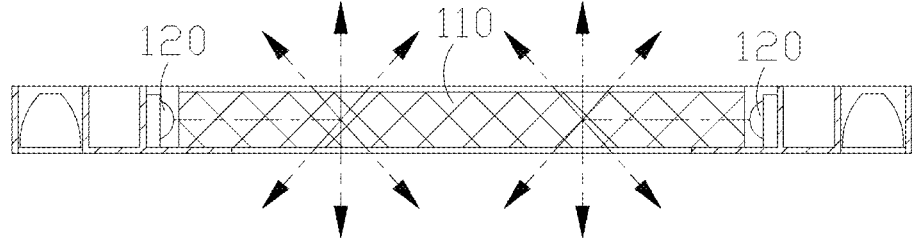
FIG. 10 is a light path diagram of a third embodiment of the first light source of the present invention.

As shown in FIG. 10, in a third embodiment, a plurality of the LED light sources (120) are arranged around the periphery of the light guide plate (110), and light emitted from the LED light sources (120) enters the light guide plate (110) through side surfaces of the light guide plate (110) and exits through both a bottom surface and a top surface of the light guide plate (110).

Figure 11:
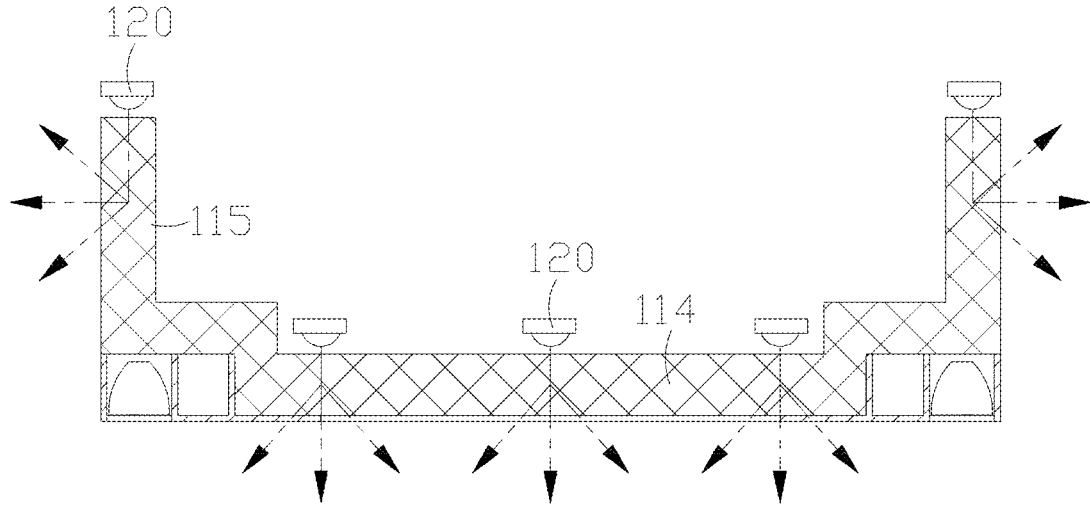
FIG. 11 is a light path diagram of a fourth embodiment of the first light source of the present invention.

As shown in FIG. 11, in a fourth embodiment, the light guide plate (110) comprises a lower light guide plate (114) and an upper light guide plate (115), wherein the upper light guide plate (115) protrudes upwards from the top of the lower light guide plate (114), and light emitted from a plurality of the LED light sources (120) passes through the lower light guide plate (114) and the upper light guide plate (115), respectively. By using both the lower light guide plate (114) and the upper light guide plate (115), ambient lighting effect can be further enhanced.

In practice, the overall shape of the light guide plate (110) in the fourth embodiment may be configured in various forms, such as cylindrical, lantern-shaped, or other suitable shapes. The lower light guide plate (114) may be configured as disk-shaped or square, while the upper light guide plate (115) may be configured as ring-shaped, cylindrical, square tubular, or other suitable shapes.

As shown in FIG. 7, in a practical embodiment, the second light source (200) has a light-emitting angle (B), and the illumination light (L2) generated by the second light source (200) is irradiated into the lighting space (A) to form an illumination region (C2). The illumination region (C2) is located within the irradiation region (C1).

A larger of the light-emitting angle (B) results in a larger area of the illumination region (C2), while a smaller of the light-emitting angle (B) results in a smaller area of the illumination region (C2).

In practice, since the first light source (100) is a planar light source, when a human eye (E) is located within the irradiation region (C1) and directly views the first light source (100), glare and dazzling issues do not occur. However, because the second light source (200) is a point light source, when a human eye (E) is located within the illumination region (C2) and directly views the second light source (200), glare and dazzling issues are likely to occur. The present invention allows for the control of the size of the illumination region (C2) by adjusting the light-emitting angle (B) of the second light source (200), thereby reducing occurrences of glare and dazzling.

In a specific embodiment, the second light source (200) has several preferred implementations, which are described respectively as follows.

Figure 12:
FIG. 12 is a light path diagram of a first embodiment of the second light source of the present invention.

As shown in FIG. 12, in a first embodiment, the second light source (200) comprises an optical lens (210) and an LED point light source (220), the optical lens (210) has a light incident end (211) and a light emitting end (212), the LED point light source (220) corresponds to the light incident end (211), the illumination light (L2) emitted from the LED point light source (220) enters the optical lens (210) through the light incident end (211) and exits through the light emitting end (212), and light output angle of the optical lens (210) is the light-emitting angle (B) of the second light source (200).

Figure 13:
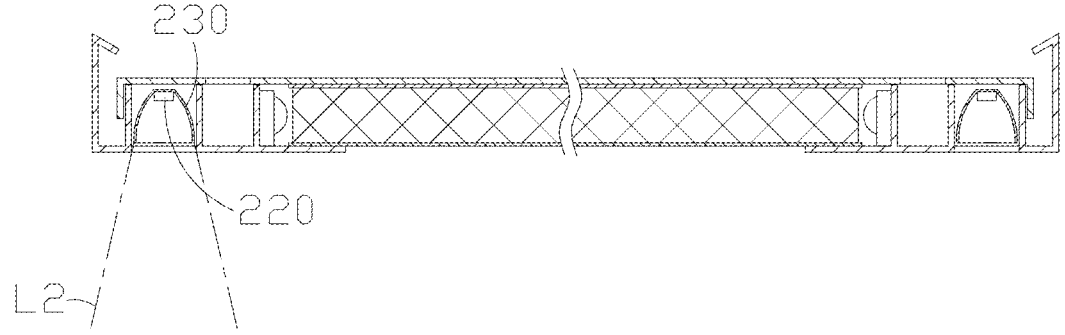
FIG. 13 is a light path diagram of a second embodiment of the second light source of the present invention.

As shown in FIG. 13, in a second embodiment, the second light source (200) comprises a reflector cup (230) and an LED point light source (220), wherein the LED point light source (220) is disposed within the reflector cup (230), and light output angle of the reflector cup (230) is the light-emitting angle (B) of the second light source (200).

Figure 14:
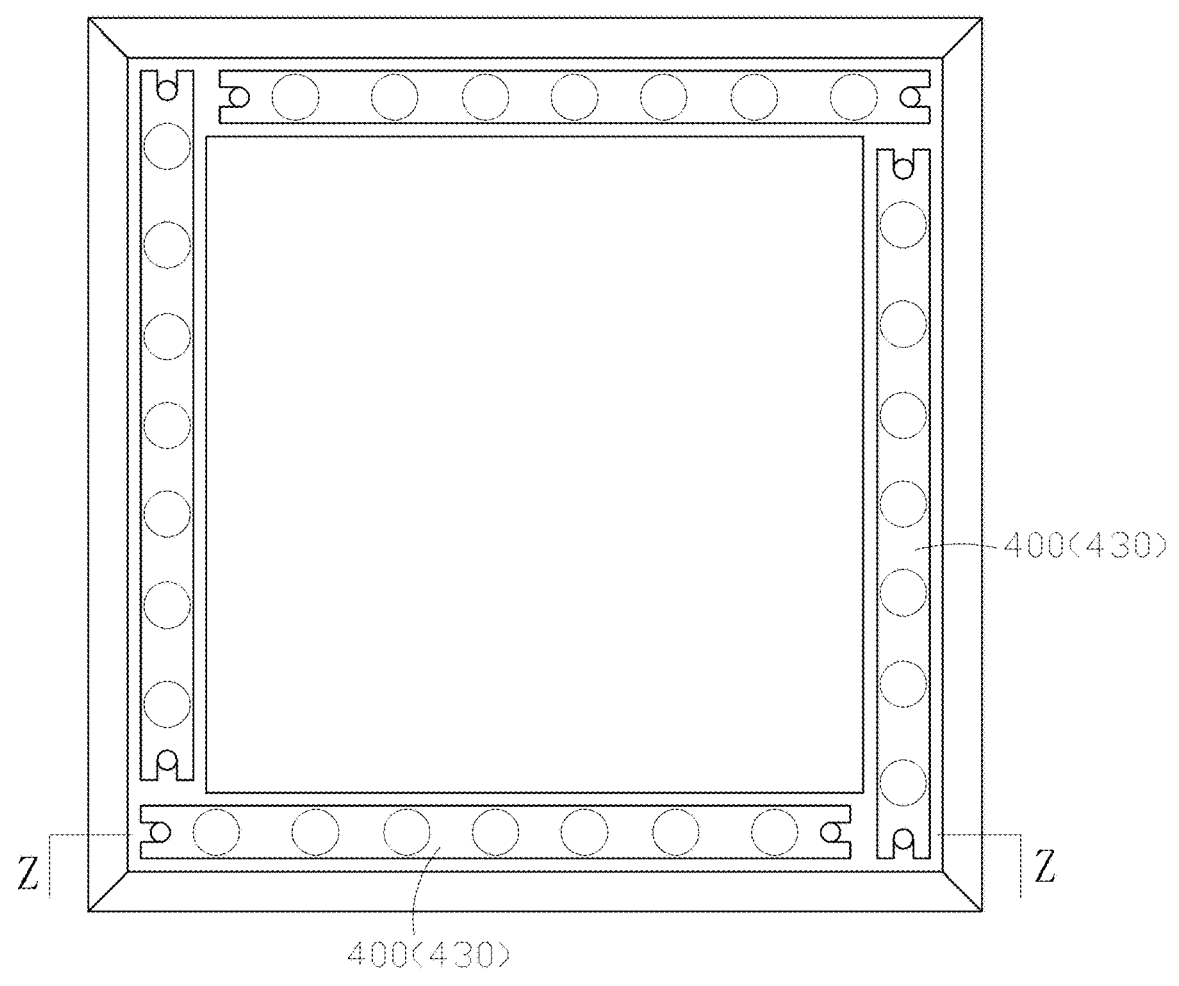
FIG. 14 is a schematic view of the light source adjuster of the present invention.
Figure 15:
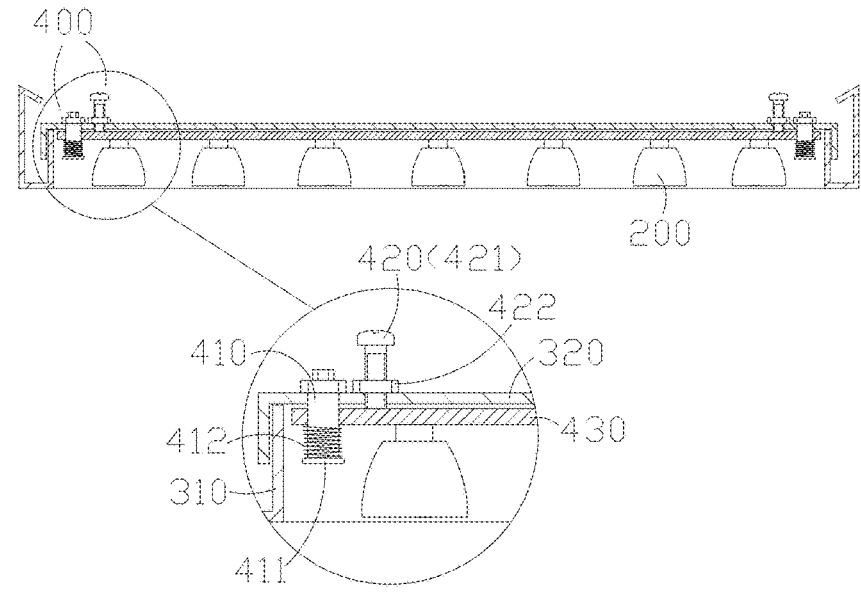
FIG. 15 is a cross-sectional structural view taken along line Z-Z in FIG. 14.

As shown in FIG. 14 and FIG. 15, the dual-light source ceiling-mounted LED lighting fixture further comprises a light source adjuster (400).

The light source adjuster (400) is capable of adjusting the position of the second light source (200) within the second light source chamber (312), thereby adjusting the area of the illumination region (C2) of the second light source (200).

In practice, the light source adjuster (400) is capable of driving the second light source (200) to move upward or downward within the second light source chamber (312), thereby adjusting the area of the illumination region (C2) of the second light source (200).

In a specific embodiment, the fixture body (300) comprises a top cover (320), and the top cover (320) is disposed on top of the ceiling light frame (310).

The light source adjuster (400) comprises a guide post (410), a pushing post (420), and a light board (430), wherein the guide post (410) is fixedly arranged on the top cover (320) of the fixture body (300), a limiting plate (411) is disposed at the bottom of the guide post (410), and a spring (412) is sleeved around the guide post (410). A plurality of the second light sources (200) are mounted on the light board (430). The guide post (410) penetrates through the light board (430), and the spring (412) is located between the light board (430) and the limiting plate (411). The pushing post (420) is pressed on top of the light board (430).

During operation, when the pushing post (420) moves downward, the pushing post (420) presses the light board (430), causing the spring (412) to be compressed, such that the light board (430) and a plurality of the second light sources (200) move downward within the ceiling light frame (310).

When the pushing post (420) moves upward, the spring (412) pushes the light board (430) upward, such that the light board (430) and a plurality of the second light sources (200) move upward within the ceiling light frame (310).

In a specific embodiment, the pushing post (420) comprises a screw rod (421) and a fixing nut (422), wherein the fixing nut (422) is fixed to the top cover (320), and the screw rod (421) is threaded into the fixing nut (422), whereby screwing the screw rod (421) into or out of the fixing nut (422) causes the pushing post (420) to move upward or downward.

In a specific embodiment, the pushing post (420) may also be replaced by an electromagnetic actuator, wherein a coil of the electromagnetic actuator is disposed on the top cover (320), and a magnetic block of the electromagnetic actuator is disposed on the light board (430). The light board (430) can be driven to move upward or downward by the magnetic force between the coil and the magnetic block.

In a specific embodiment, the second light source (200) may also be an LED linear light source.

What is claimed is:

1. A dual-light source ceiling-mounted LED lighting fixture, comprising a first light source (100), a second light source (200), and a fixture body (300), wherein said first light source (100) and said second light source (200) are disposed within said fixture body (300), and said fixture body (300) is arranged in an illumination space (A), wherein said first light source (100) is a planar light source, said first light source (100) is configured to generate ambient light (L1), said ambient light (L1) is irradiated into said illumination space (A), and said ambient light (L1) is used to enhance ambient lighting effect in said illumination space (A), wherein said second light source (200) is a point light source, said second light source (200) is configured to generate illumination light (L2), said illumination light (L2) is irradiated into said illumination space (A), and said illumination light (L2) is used to provide functional lighting, said fixture body (300) comprises a ceiling light frame (310), and said ceiling light frame (310) has a first light source chamber (311) and a second light source chamber (312), said first light source (100) is disposed in said first light source chamber (311), and said second light source (200) is disposed in said second light source chamber (312);

wherein said first light source (100) comprises a light guide plate (110) and a plurality of LED light sources (120), and light emitted from a plurality of said LED light sources (120) passes through said light guide plate (110) and is irradiated out from said first light source chamber (311), said ambient light (L1) generated by said first light source (100) forms an irradiation region (C1) in said illumination space (A), wherein said second light source (200) has a light-emitting angle (B), and said illumination light (L2) generated by said second light source (200) is irradiated into said lighting space (A) to form an illumination region (C2), said illumination region (C2) is located within said irradiation region (C1).

2. The dual-light source ceiling-mounted LED lighting fixture, as recited in claim 1, wherein a plurality of said LED light sources (120) are arranged around the periphery of said light guide plate (110), and light emitted from said LED light sources (120) enters said light guide plate (110) through side surfaces of said light guide plate (110), and exits through a bottom surface of said light guide plate (110), a top surface of said light guide plate (110) is covered with a reflective film.

3. The dual-light source ceiling-mounted LED lighting fixture, as recited in claim 1, wherein a plurality of said LED light sources (120) are arranged on top of a light guide panel (130), and light emitted from said LED light sources (120) enters through a top surface of said light guide panel (130) and exits through a bottom surface of said light guide panel (130).

4. The dual-light source ceiling-mounted LED lighting fixture, as recited in claim 1, wherein a plurality of said LED light sources (120) are arranged around the periphery of said light guide plate (110), and light emitted from said LED light sources (120) enters said light guide plate (110) through side surfaces of said light guide plate (110), and exits through both a bottom surface and a top surface of said light guide plate (110).

5. The dual-light source ceiling-mounted LED lighting fixture, as recited in claim 1, wherein said light guide plate (110) comprises a lower light guide plate (114) and an upper light guide plate (115), wherein said upper light guide plate (115) protrudes upwards from the top of said lower light guide plate (114), and light emitted from a plurality of said LED light sources (120) passes through said lower light guide plate (114) and said upper light guide plate (115).

6. The dual-light source ceiling-mounted LED lighting fixture, as recited in claim 1, wherein said second light source (200) comprises an optical lens (210) and an LED point light source (220), said optical lens (210) has a light incident end (211) and a light emitting end (212), said LED point light source (220) corresponds to said light incident end (211), said illumination light (L2) emitted from said LED point light source (220) enters said optical lens (210) through said light incident end (211) and exits through said light emitting end (212), and light output angle of said optical lens (210) is said light-emitting angle (B) of said second light source (200).

7. The dual-light source ceiling-mounted LED lighting fixture, as recited in claim 1, wherein said second light source (200) comprises a reflector cup (230) and an LED point light source (220), said LED point light source (220) is disposed within said reflector cup (230), and light output angle of said reflector cup (230) is said light-emitting angle (B) of said second light source (200).

8. The dual-light source ceiling-mounted LED lighting fixture, as recited in claim 1, wherein said dual-light source ceiling-mounted LED lighting fixture further comprises a light source adjuster (400), said second light source (200) is mounted on said light source adjuster (400), said light source adjuster (400) is configured to adjust the position of said second light source (200) within said second light source chamber (312), thereby adjusting the area of said illumination region (C2) of said second light source (200).

9. The dual-light source ceiling-mounted LED lighting fixture, as recited in claim 8, wherein said light source adjuster (400) is configured to drive said second light source (200) to move upward or downward within said second light source chamber (312), thereby adjusting the area of said illumination region (C2) of said second light source (200).

10. The dual-light source ceiling-mounted LED lighting fixture, as recited in claim 8, wherein said fixture body (300) comprises a top cover (320), and said top cover (320) is disposed on top of said ceiling light frame (310), said light source adjuster (400) comprises a guide post (410), a pushing post (420), and a light board (430), wherein said guide post (410) is fixedly arranged on said top cover (320) of said fixture body (300), a limiting plate (411) is disposed at the bottom of said guide post (410), and a spring (412) is sleeved around said guide post (410), a plurality of said second light sources (200) are mounted on said light board (430), said guide post (410) penetrates through said light board (430), and said spring (412) is located between said light board (430) and said limiting plate (411), while said pushing post (420) is pressed on top of said light board (430), when said pushing post (420) moves downward, said pushing post (420) presses said light board (430), causing said spring (412) to be compressed, such that said light board (430) and a plurality of said second light sources (200) move downward within said ceiling light frame (310), when said pushing post (420) moves upward, said spring (412) pushes said light board (430) upward, such that said light board (430) and a plurality of said second light sources (200) move upward within said ceiling light frame (310).

11. The dual-light source ceiling-mounted LED lighting fixture, as recited in claim 10, wherein said pushing post (420) comprises a screw rod (421) and a fixing nut (422), wherein said fixing nut (422) is fixed to said top cover (320), and said screw rod (421) is threaded into said fixing nut (422), whereby screwing said screw rod (421) into or out of said fixing nut (422) causes said pushing post (420) to move downward or upward.

12. The dual-light source ceiling-mounted LED lighting fixture, as recited in claim 10, wherein said pushing post (420) is an electromagnetic actuator, wherein a coil of said electromagnetic actuator is disposed on said top cover (320), and a magnetic block of said electromagnetic actuator is disposed on said light board (430), wherein magnetic force between said coil and said magnetic block drives said light board (430) to move upward or downward.

13. The dual-light source ceiling-mounted LED lighting fixture, as recited in claim 1, wherein said second light source (200) is an LED linear light source.

14. A dual-light source ceiling-mounted LED lighting fixture, comprising a first light source (100), a second light source (200), and a fixture body (300), wherein said first light source (100) and said second light source (200) are disposed within said fixture body (300), and said fixture body (300) is arranged in an illumination space (A), wherein said first light source (100) is a planar light source, said first light source (100) is configured to generate ambient light (L1), said ambient light (L1) is irradiated into said illumination space (A), and said ambient light (L1) is used to enhance ambient lighting effect in said illumination space (A), wherein said second light source (200) is a point light source, said second light source (200) is configured to generate illumination light (L2), said illumination light (L2) is irradiated into said illumination space (A), and said illumination light (L2) is used to provide functional lighting, said fixture body (300) comprises a ceiling light frame (310), and said ceiling light frame (310) has a first light source chamber (311) and a second light source chamber (312), said first light source (100) is disposed in said first light source chamber (311), and said second light source (200) is disposed in said second light source chamber (312);

wherein said ambient light (L1) comprises light of different colors and has variable brightness.

15. A dual-light source ceiling-mounted LED lighting fixture, comprising a first light source (100), a second light source (200), and a fixture body (300), wherein said first light source (100) and said second light source (200) are disposed within said fixture body (300), and said fixture body (300) is arranged in an illumination space (A), wherein said first light source (100) is a planar light source, said first light source (100) is configured to generate ambient light (L1), said ambient light (L1) is irradiated into said illumination space (A), and said ambient light (L1) is used to enhance ambient lighting effect in said illumination space (A), wherein said second light source (200) is a point light source, said second light source (200) is configured to generate illumination light (L2), said illumination light (L2) is irradiated into said illumination space (A), and said illumination light (L2) is used to provide functional lighting, said fixture body (300) comprises a ceiling light frame (310), and said ceiling light frame (310) has a first light source chamber (311) and a second light source chamber (312), said first light source (100) is disposed in said first light source chamber (311), and said second light source (200) is disposed in said second light source chamber (312), said first light source (100) comprises a light guide plate (110) and a plurality of LED light sources (120), and light emitted from a plurality of said LED light sources (120) passes through said light guide plate (110) and is irradiated out from said first light source chamber (311), said ambient light (L1) generated by said first light source (100) forms an irradiation region (C1) in said illumination space (A), said second light source (200) has a light-emitting angle (B), and said illumination light (L2) generated by said second light source (200) is irradiated into said lighting space (A) to form an illumination region (C2), said illumination region (C2) is located within said irradiation region (C1), said second light source (200) comprises an optical lens (210) and an LED point light source (220), said optical lens (210) has a light incident end (211) and a light emitting end (212), said LED point light source (220) corresponds to said light incident end (211), said illumination light (L2) emitted from said LED point light source (220) enters said optical lens (210) through said light incident end (211) and exits through said light emitting end (212), and light output angle of said optical lens (210) is said light-emitting angle (B) of said second light source (200), said dual-light source ceiling-mounted LED lighting fixture further comprises a light source adjuster (400), said second light source (200) is mounted on said light source adjuster (400), said light source adjuster (400) is configured to drive said second light source (200) to move upward or downward within said second light source chamber (312), thereby adjusting the area of said illumination region (C2) of said second light source (200).

16. The dual-light source ceiling-mounted LED lighting fixture, as recited in claim 15, wherein said fixture body (300) comprises a top cover (320), and said top cover (320) is disposed on top of said ceiling light frame (310), said light source adjuster (400) comprises a guide post (410), a pushing post (420), and a light board (430), wherein said guide post (410) is fixedly arranged on said top cover (320) of said fixture body (300), a limiting plate (411) is disposed at the bottom of said guide post (410), and a spring (412) is sleeved around said guide post (410), a plurality of said second light sources (200) are mounted on said light board (430), said guide post (410) penetrates through said light board (430), and said spring (412) is located between said light board (430) and said limiting plate (411), while said pushing post (420) is pressed on top of said light board (430), when said pushing post (420) moves downward, said pushing post (420) presses said light board (430), causing said spring (412) to be compressed, such that said light board (430) and a plurality of said second light sources (200) move downward within said ceiling light frame (310), when said pushing post (420) moves upward, said spring (412) pushes said light board (430) upward, such that said light board (430) and a plurality of said second light sources (200) move upward within said ceiling light frame (310).

17. The dual-light source ceiling-mounted LED lighting fixture, as recited in claim 16, wherein said pushing post (420) comprises a screw rod (421) and a fixing nut (422), wherein said fixing nut (422) is fixed to said top cover (320), and said screw rod (421) is threaded into said fixing nut (422), whereby screwing said screw rod (421) into or out of said fixing nut (422) causes said pushing post (420) to move downward or upward.

\* \* \* \* \*